(12) United States Patent
Kadoi et al.

(10) Patent No.: US 6,331,620 B1
(45) Date of Patent: Dec. 18, 2001

(54) SOLID CATALYST COMPONENTS FOR OLEFIN POLYMERIZATION, CATALYSTS FOR OLEFIN POLYMERIZATION AND PROCESS FOR PRODUCING OLEFIN POLYMERS

(75) Inventors: Yasunori Kadoi; Tsuyoshi Ota; Toshio Isozaki; Kiyokazu Katayama; Takanori Sadashima, all of Ichihara (JP)

(73) Assignee: Idemitsu Petrochemical Co., Ltd., Tokyo (JP)

(*) Notice: Subject to any disclaimer, the term of this patent is extended or adjusted under 35 U.S.C. 154(b) by 0 days.

(21) Appl. No.: 09/463,999
(22) PCT Filed: Aug. 17, 1998
(86) PCT No.: PCT/JP98/03646
§ 371 Date: Feb. 22, 2000
§ 102(e) Date: Feb. 22, 2000
(87) PCT Pub. No.: WO99/10390
PCT Pub. Date: Mar. 4, 1999

(30) Foreign Application Priority Data

Aug. 22, 1997 (JP) .................................................. 9-226162

(51) Int. Cl.⁷ ........................................................ C08F 2/00
(52) U.S. Cl. .................... 536/213; 526/128; 526/142; 526/158; 526/124.1; 526/124.3; 526/348; 502/127; 502/103; 502/133
(58) Field of Search ................................. 526/128, 213, 526/348, 142, 158, 124.3, 124.1; 502/127, 103, 133

(56) References Cited

FOREIGN PATENT DOCUMENTS

| | | |
|---|---|---|
| 38 51 313 | 12/1994 | (DE) . |
| 0 125 911 | * 11/1984 | (EP) . |
| 57-063310 | 4/1982 | (JP) . |
| 58-138709 | 8/1983 | (JP) . |
| 6-122716 | 5/1994 | (JP) . |
| 6-279517 | 10/1994 | (JP) . |
| 8-157521 | * 6/1999 | (JP) . |
| 11-199628 | * 7/1999 | (JP) . |
| WO 98/56830 | 12/1998 | (WO) . |
| WO 98/56834 | * 12/1998 | (WO) . |

OTHER PUBLICATIONS

Derwent Publications, AN 96–3392111, JP 08–157521, Jun. 18, 1996.

* cited by examiner

Primary Examiner—David W. Wu
Assistant Examiner—Ling-Siu Choi
(74) Attorney, Agent, or Firm—Oblon, Spivak, McClelland, Maier & Neustadt, P.C.

(57) ABSTRACT

Solid catalyst components for the polymerization of olefins, comprising titanium, magnesium and a compound of general formula (I), wherein $R^1$ and $R^2$ may be the same or different and each represents a linear or branched hydrocarbon group having 1 to 20 carbon atoms, and n is an integer of 1 to 10, as an electron donor, which are combined with organoaluminum compounds to form polymerization catalysts for the production of olefin polymers. This electron donor has no problems of safety and hygiene, and is inexpensive and easily synthesized. This compound can provide highly active and highly stereoregular solid catalyst components for the polymerization of olefins, catalysts for the polymerization of olefins, and processes for producing olefin polymers.

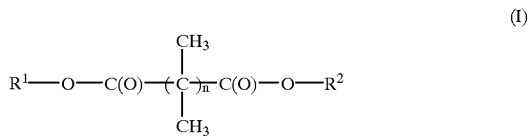

(I)

7 Claims, 1 Drawing Sheet

SOLID CATALYST COMPONENTS FOR OLEFIN POLYMERIZATION, CATALYSTS FOR OLEFIN POLYMERIZATION AND PROCESS FOR PRODUCING OLEFIN POLYMERS

TECHNICAL FIELD

The present invention relates to solid catalyst components for olefin polymerization and catalysts for olefin polymerization, which are for producing homopolymers or copolymers of olefins through homopolymerization or copolymerization of ethylene and other α-olefins, and also to processes for producing olefin polymers.

BACKGROUND OF THE INVENTION

Many solid catalyst components have heretofore been proposed, which comprise, as the essential catalyst ingredients, magnesium, titanium, halogens and electron donors. It is well known that these catalysts display high activity in olefin polymerization, and exhibit high stereospecificity in polymerization of α-olefins. In particular, it is known that solid catalyst components comprising, as electron donors, aromatic esters such as typically phthalates have excellent catalytic capabilities. However, using aromatic compounds is often disliked because of their problems of safety and hygiene.

Using malonate derivatives as non-aromatic electron donors has been proposed. For example, in Japanese Patent Publication No. 80044/1992, proposed are compounds of a general formula (II):

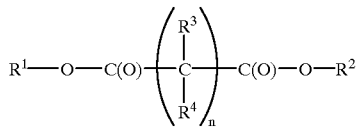

(II)

wherein either one or both of $R^3$ and $R^4$ are linear or branched hydrocarbon groups each having 4 carbon atoms, or aromatic hydrocarbon groups. However, using the compounds does not provide satisfactory stereospecificity in polymer production. In Japanese Patent Laid-Open No. 122716/1994, proposed are compounds of formula (II) where $R^3$ and $R^4$ are bonded to each other to form a cyclic structure. In Japanese Patent Laid-Open No. 279517/1994, proposed are compounds of formula (II) where $R^3$ and $R^4$ are both hydrogen atoms; those where either one of $R^3$ and $R^4$ is a linear or branched hydrocarbon group having at least one carbon atom, or an aromatic hydrocarbon group, and where the other is a hydrogen atom; and those where both $R^3$ and $R^4$ are linear hydrocarbon groups each having at least 2 carbon atoms. However, using the compounds provides extremely poor yields of polymers. In Japanese Patent Laid-Open No. 157521/1996, proposed are compounds of formula (II) where both $R^3$ and $R^4$ are branched or cyclic hydrocarbon groups each having at least 3 carbon atoms. However, the malonates having such branched or cyclic hydrocarbon groups are difficult to produce, and, in addition, using them provides poor yields of polymers and is therefore impracticable. In Japanese Patent Laid-Open Nos. 124705/1991 and 168207/1991, using other non-aromatic diesters as electron donors is proposed. However, the non-aromatic diesters proposed are not always satisfactory for providing a high yields of stereospecific polymers.

The object of the present invention is to provide solid catalyst components for olefin polymerization, catalysts for olefin polymerization and processes for producing olefin polymers, for which are used, as electron donors, compounds having no problems of safety and hygiene. The compounds for electron donors are inexpensive and are easy to produce, and display high activity and high stereospecificity in olefin polymerization.

DISCLOSURE OF THE INVENTION

We, the present inventors have assiduously studied so as to attain the object as above, and, as a result, have found that using solid catalyst components for olefin polymerization, which comprise titanium, magnesium, and a compound of the following general formula (I) as an electron donor solves the problems noted above. On the basis of this finding, we have completed the present invention.

Specifically, the invention provides solid catalyst components for olefin polymerization, catalysts for olefin polymerization, and processes for producing olefin polymers, which are as follows:

(1) A solid catalyst component for olefin polymerization, comprising titanium, magnesium, and a compound of the following general formula (I) as an electron donor:

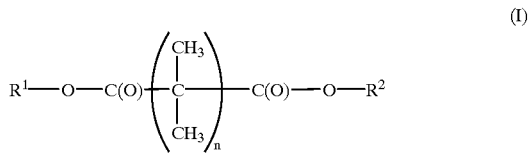

(I)

wherein $R^1$ and $R^2$ may be the same or different and each represents a linear or branched hydrocarbon group having from 1 to 20 carbon atoms; and n is an integer of from 1 to 10.

(2) A catalyst for olefin polymerization, comprising (A) the solid catalyst component for olefin polymerization of (1), and (B) an organoaluminium compound.

(3) A catalyst for olefin polymerization, comprising (A) the solid catalyst component for olefin polymerization of (1), (B) an organoaluminium compound, and (C) an electron-donating compound as the third component.

(4) The catalyst for olefin polymerization of (3), wherein the electron-donating compound for the third component (C) is an organosilicon compound.

(5) A process for producing olefin polymers, which comprises polymerizing olefins in the presence of the catalyst for olefin polymerization of any one of (2) to (4).

BEST MODES OF CARRYING OUT THE INVENTION

Figure 1:
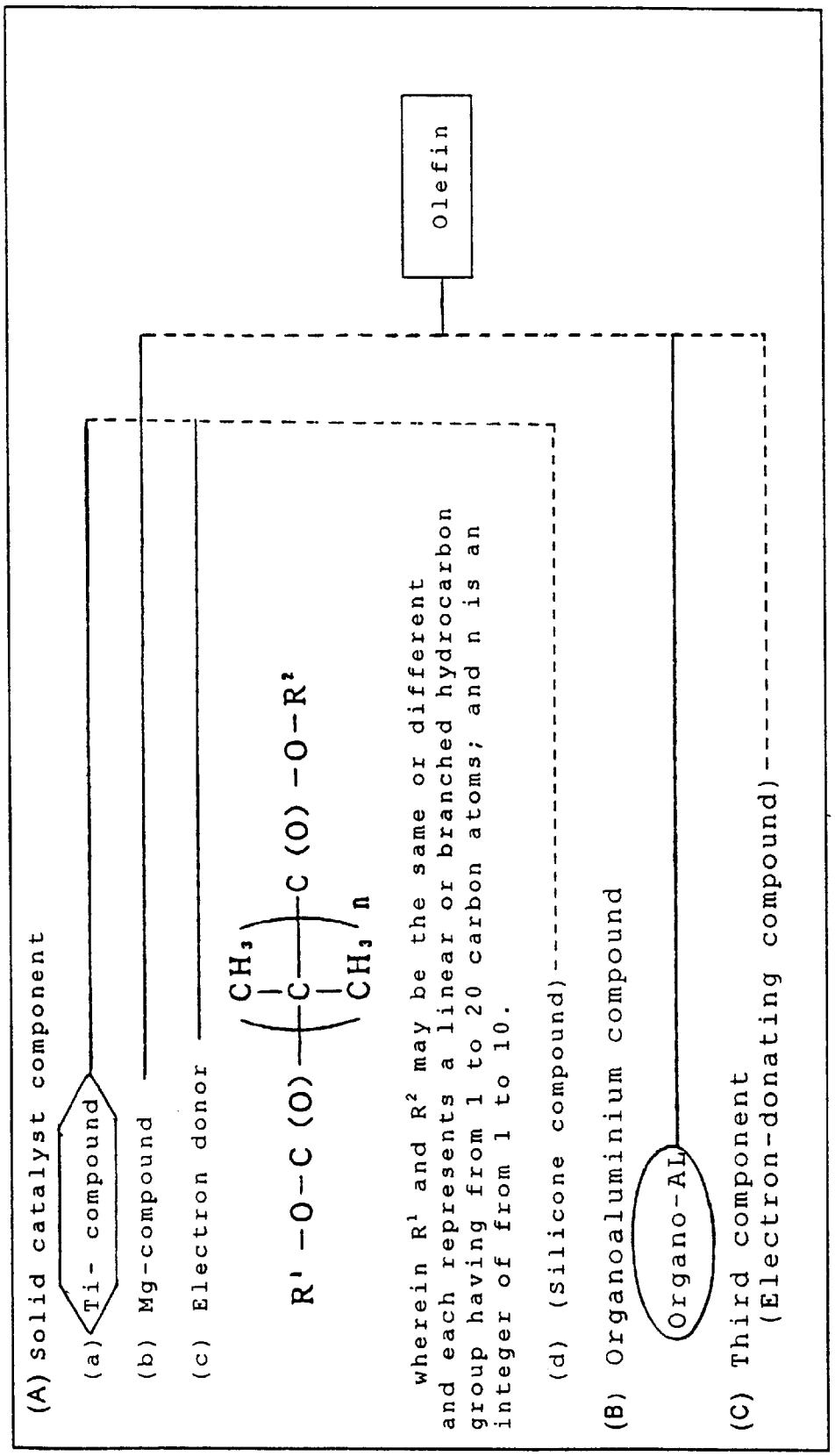
FIG. 1 is a flowchart showing one embodiment of olefin polymerization of the invention.

The solid catalyst component for olefin polymerization of the invention is characterized by comprising titanium, magnesium, and a compound of the following general formula (I) as an electron donor:

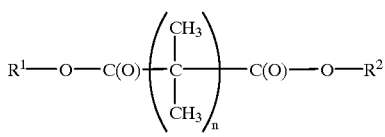 (I)

wherein $R^1$ and $R^2$ maybe the same or different and each represents a linear or branched hydrocarbon group having from 1 to 20 carbon atoms; and n is an integer of from 1 to 10.

The catalyst for olefin polymerization of the invention is characterized by comprising (A) the solid catalyst component for olefin polymerization as above, (B) an organoaluminium compound, and optionally (C) an electron-donating compound as the third component.

The process for producing olefin polymers of the invention is characterized by polymerizing olefins in the presence of the catalyst for olefin polymerization as above.

The catalyst components, methods for preparing them, and polymerization processes are described below.

[I] Catalyst Components
(A) Solid Catalyst Components for Olefin Polymerization:

The solid catalyst component for olefin polymerization comprises titanium, magnesium, and an electron donor, and is made from the following titanium compound (a), magnesium compound (b) and electron donor (c).

(a) Titanium Compound:

Titanium compounds of the following general formula (III) may be used in the invention:

 (III)

In formula (III), $X^1$ represents a halogen atom, and is preferably a chlorine or bromine atom. More preferred is a chlorine atom. $R^5$ represents a hydrocarbon group, which may be saturated or unsaturated, and may be linear, branched or cyclic. It may contain hetero atoms of sulfur, nitrogen, oxygen, silicon, phosphorus, etc., but is preferably a hydrocarbon group having from 1 to 10 carbon atoms, more preferably an alkyl, alkenyl, cycloalkenyl, aryl or aralkyl group, even more preferably a linear or branched alkyl group. Plural —$OR^5$'s, if any, may be all the same or be of different compositions. Specific examples of $R^5$ include a methyl group, an ethyl group, an n-propyl group, an isopropyl group, an n-butyl group, a sec-butyl group, an isobutyl group, a pentyl group, a hexyl group, a heptyl group, an octyl group, a decyl group, an allyl group, a butenyl group, a cyclopentyl group, a cyclohexyl group, a cyclohexenyl group, a phenyl group, a tolyl group, a benzyl group, a phenethyl group, etc. p is an integer of from 0 to 4.

Specific examples of the titanium compounds of formula (III) include tetraalkoxytitaniums such as tetramethoxytitanium, tetraethoxytitanium, tetra-n-propoxytitanium, tetraisopropoxytitanium, tetra-n-butoxytitanium, tetraisobutoxytitanium, tetracyclohexyloxytitanium, tetraphenoxytitanium, etc.; titanium tetrahalides such as titanium tetrachloride, titanium tetrabromide, titanium tetraiodide, etc.; alkoxytitanium trihalides such as methoxytitanium trichloride, ethoxytitanium trichloride, propoxytitanium trichloride, n-butoxytitanium trichloride, ethoxytitanium tribromide, etc.; dialkoxytitanium dihalides such as dimethoxytitanium dichloride, diethoxytitanium dichloride, diisopropoxytitanium dichloride, di-n-propoxytitanium dichloride, diethoxytitanium dibromide, etc.; trialkoxytitanium monohalides such as trimethoxytitanium chloride, triethoxytitanium chloride, triisopropoxytitanium chloride, tri-n-propoxytitanium chloride, tri-n-butoxytitanium chloride, etc. Of those, preferred are high-halogen titanium compounds, and especially preferred is titanium tetrachloride. One or more of these titanium compounds may be used either singly or as combined.

(b) Magnesium Compound:

Magnesium compounds of the following formula (IV) may be used in the invention.

 (IV)

In formula (IV), $R^6$ and $R^7$ each represent a hydrocarbon group, an $OR^8$ group (where R8 indicates a hydrocarbon group), or a halogen atom. More precisely, the hydrocarbon group may be an alkyl, cycloalkyl, aryl or aralkyl group having from 1 to 12 carbon atoms. In $OR^8$, $R^8$ represents an alkyl, cycloalkyl, aryl or aralkyl group having from 1 to 12 carbon atoms. The halogen atom includes chlorine, bromine, iodine and fluorine atoms. $R^6$ and $R^7$ may be the same or different.

Specific examples of the magnesium compounds of formula (IV) include alkylmagnesiums and arylmagnesiums such as dimethylmagnesium, diethylmagnesium, diisopropylmagnesium, dibutylmagnesium, dihexylmagnesium, dioctylmagnesium, ethylbutylmagnesium, diphenylmagnesium, dicyclohexylmagnesium, etc.; alkoxymagnesiums and aryloxymagnesiums such as dimethoxymagnesium, diethoxymagnesium, dipropoxymagnesium, dibutoxymagnesium, dihexyloxymagnesium, dioctoxymagnesium, diphenoxymagnesium, dicyclohexyloxymagnesium, etc.; alkylmagnesium halides and arylmagnesium halides such as ethylmagnesium chloride, butylmagnesium chloride, hexylmagnesium chloride, isopropylmagnexium chloride, isobutylmagnesium chloride, t-butylmagnesium chloride, phenylmagnesium bromide, benzylmagnesium chloride, ethylmagnesium bromide, butylmagnesium bromide, phenylmagnesium chloride, butylmagnesium iodide, etc.; alkoxymagnesium halides and aryloxymagnesium halides such as butoxymagnesium chloride, cyclohexyloxymagnesium chloride, phenoxymagnesium chloride, ethoxymagnesium bromide, butoxymagnesium bromide, ethoxymagnesium iodide, etc.; magnesium halides such as magnesium chloride, magnesium bromide, magnesium iodide, etc.

Of those magnesium compounds, preferred are magnesium halides, alkoxymagnesiums, alkylmagnesiums, and alkylmagnesium halides.

As the magnesium compounds, also usable herein are reaction products of metal magnesium with an alcohol, and a halogen and/or a halogen-containing compound. Catalysts comprising such magnesium reaction products are preferred, as having higher catalyst activity, capable of displaying better stereospecificity, and capable of carrying a larger amount of titanium therewith. In the presence of such catalysts, therefore, obtainable are powdery polymers having better morphology. The shape of the metal magnesium to be used in preparing the magnesium reaction products is not specifically defined, and metal magnesium of any shape is employable. For example, the metal magnesium may be any of granular, ribbon-like or powdery magnesium. The surface condition of the metal magnesium is not also specifically defined. Preferably, however, the metal magnesium for use herein is not coated with a film of magnesium oxide or the like.

The alcohol for use herein is not also specifically defined. Preferred is a lower alcohol having from 1 to 6 carbon atoms, and especially preferred is ethanol, as providing solid catalysts having better catalytic capabilities. The purity and the water content of the alcohol are not also specifically defined. However, alcohols with much water will form magnesium hydroxide on the surface of metal magnesium. Therefore, it is desirable to use alcohols having a water content of at most 1% by weight, more preferably at most 2000 ppm. For preparing magnesium compounds capable of providing polymers with better morphology, preferred are alcohols having a smaller water content.

The type of the halogen for use herein is not also specifically defined. Preferred is chlorine, bromine or iodine, and especially preferred is iodine. The halogen-containing compound is not also specifically defined, and it may be any compound containing a halogen atom in its molecule. The type of the halogen atom to be in the compound is not specifically defined, but preferred are chlorine, bromine and iodine. As the halogen-containing compound, preferred are halogen-containing metal compounds.

Specific examples of the halogen-containing compounds include $MgCl_2$, $MgI_2$, $Mg(OEt)Cl$, $Mg(OEt)I$, $MgBr_2$, $CaCl_2$, $NaCl$, $KBr$, etc. Especially preferred are $MgCl_2$ and $MgI_2$. The condition, the shape and the grain size of those compounds are not specifically defined. For example, the compounds may be used in the form of their solutions in alcohols such as ethanol, etc.

The a mount of the alcohol to be used in the reaction may fall generally between 2 and 100 mols, preferably between 5 and 50 mols, relative to one mol of metal magnesium. If the amount of the alcohol is too large, magnesium compounds capable of providing polymers with good morphology are difficult to prepare; but if too small, the reaction with metal magnesium will not progress well. The amount of the halogen or the halogen-containing compound to be used in the reaction may be generally at least 0.0001 gram atoms, preferably at least 0.0005 gram atoms, more preferably at least 0.001 gram atoms, even more preferably at least 0.01 gram atoms, in terms of the halogen element relative to 1 mol of metal magnesium. If the amount of the halogen is smaller than 0.0001 gram atoms and if the magnesium compounds prepared are used without being ground, the amount of titanium to be carried on the compounds will be low. If so, in addition, the catalytic activity of the compounds will be low, and the stereospecificity and the morphology of the polymers to be produced will be not good. Therefore, grinding the magnesium compounds prepared is indispensable. For these reasons, using such a small amount of the halogen is unfavorable. The uppermost limit of the halogen to be used is not specifically defined, and may be suitably determined within the range within which the desired amount of magnesium compounds will be prepared. Using suitable amount of halogen, the grain size of the magnesium compounds to be prepared can be controlled to any desired range.

The reaction of metal magnesium with an alcohol, and a halogen or halogen-containing compound may be effected in any desired manner. For example, metal magnesium may be reacted with an alcohol, and a halogen or halogen-containing compound under reflux, until no hydrogen gas is formed any more in the reaction system, generally requiring from 20 to 30 hours. The desired magnesium compounds are thus produced. Concretely, where iodine is used as the halogen, solid iodine is put into a mixture of metal magnesium and an alcohol, and heated under reflux; or an alcohol solution containing iodine is dropwise added to a mixture of metal magnesium and an alcohol, and heated under reflux; or while a mixture of metal magnesium and an alcohol is heated, an alcohol solution containing iodine is dropwise added to the mixture. In any of these methods, the reaction is preferably effected in an inert gas atmosphere of, for example, nitrogen gas, argon gas or the like, in the presence of an inert organic solvent of, for example, a saturated hydrocarbon such as hexane or the like. Regarding the mode of putting metal magnesium and the alcohol into the reactor, it is not always necessary to put all of them into the reactor from the start of the reaction, but they may be divided into plural portions and the portions may be separately and intermittently fed into the reactor. One preferred mode is such that the entire amount of the alcohol to be reacted is first put into the reactor prior to the start of the reaction, and metal magnesium having been divided into plural portions is intermittently fed into the reactor. According to the method of this mode, a large quantity of hydrogen gas is prevented from being formed all at a time. Therefore, the method is preferred in view of the safety in the reaction. In addition, the reactor for the method can be small-sized. What is more, since a large quantity of hydrogen gas is not formed all at a time in the method, the unreacted magnesium and halogen are prevented from being scattered to contaminate the magnesium compounds produced. The number of the portions of the reactants to be divided for the reaction is not specifically defined. It could be determined, depending on the size or the scale of the reactor to be used. For easy operation, in general, it is usually divided into between 5 and 10.

The reaction may be either a batchwise or continuous one. If desired, a small amount of metal magnesium is added to a reactor, into which the entire amount of an alcohol has been previously put prior to the start of the reaction, and the product produced through the reaction of the two is taken out. Then, another small amount of metal magnesium is added thereto, and the cycle of magnesium addition and product collection may be repeated.

The reaction product thus prepared is filtered and then dried. In that manner, obtained are the desired magnesium compounds. The magnesium compounds may be used in the next step, without being purified, ground or classified. The magnesium compounds contain a halogen, in addition to the magnesium component and the alcohol component.

One or more of the magnesium compounds as above may be used either singly or as combined.

(c) Electron Donor:

As the electron donor, usable are compounds of the following general formula (I):

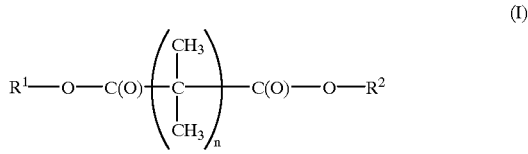

(I)

wherein $R^1$ and $R^2$ may be the same or different and each represents a linear or branched hydrocarbon group having from 1 to 20 carbon atoms; and n is an integer of from 1 to 10.

Specific examples of $R^1$ and $R^2$ include methyl, ethyl, n-propyl, i-propyl, n-butyl, i-butyl, t-butyl, n-pentyl, i-pentyl, n-hexyl, n-octyl and 2-ethylhexyl groups, etc. Preferred are hydrocarbon groups each having from 3 to 8 carbon atoms; and more preferred are n-butyl and i-butyl groups.

Specific examples of the compounds include dimethyl dimethylmalonate, diethyl dimethylmalonate, di-n-propyl dimethylmalonate, di-i-propyl dimethylmalonate, di-n-butyl dimethylmalonate, di-i-butyl dimethylmalonate, di-t-butyl dimethylmalonate, di-n-pentyl dimethylmalonate, di-i-pentyl dimethylmalonate, neopentyl dimethylmalonate, di-n-hexyl dimethylmalonate, di-n-heptyl dimethylmalonate, di-n-octyl dimethylmalonate, di(2-ethylhexyl) dimethylmalonate, etc. Of those, especially preferred is di-n-butyl dimethylmalonate. One or more of these compounds may be used either singly or combined.

(d) Silicon Compound:

In preparing the solid catalyst components, if desired, a silicon compound of the following general formula (V) may be used as the component (d), in addition to the above components (a), (b) and (c).

$$Si(OR^9)_q X^2_{4-q} \quad (V)$$

In formula (V), $X^2$ represents a halogen atom, and is preferably a chlorine or bromine atom, more preferably a chlorine atom. $R^9$ represents a hydrocarbon group, which may be saturated or unsaturated, and may be linear, branched or cyclic. It may contain hetero atoms of sulfur, nitrogen, oxygen, silicon, phosphorus, etc., but is preferably a hydrocarbon group having from 1 to 10 carbon atoms, more preferably an alkyl, alkenyl, cycloalkyl, cycloalkenyl, aryl or aralkyl group. Plural $R^9$'s, if any, may be all the same or have different compositions. Specific examples of $R^9$ include a methyl group, an ethyl group, an n-propyl group, an isopropyl group, an n-butyl group, a sec-butyl group, an isobutyl group, a pentyl group, a hexyl group, a heptyl group, an octyl group, a decyl group, an allyl group, a butenyl group, a cyclopentyl group, a cyclohexyl group, a cyclohexenyl group, a phenyl group, a tolyl group, a benzyl group, a phenethyl group, etc. q is an integer of from 0 to 3.

Specific examples of the silicon compounds of formula (V) include $SiCl_4$, $CH_3OSiCl_3$, $(CH_3O)_2SiCl_2$, $(CH_3O)_3SiCl$, $C_2H_5OSiCl_3$, $(C_2H_5O)_2SiCl_2$, $(C_2H_5O)_3SiCl$, $C_3H_7OSiCl_3$, $(C_3H_7O)_2SiCl_2$, $(C_3H_7O)_3SiCl$, etc. Of those, especially preferred is silicon tetrachloride, One of more of these silicon compounds may be used either singly or combined.

Regarding the amount of the silicon compound to be used herein as the optional component (d), the ratio by mol of silicon compound/magnesium compound should be generally at least 0.01, preferably at least 0.10. If the molar ratio is smaller than 0.01, the silicon compound used will not satisfactorily display its potential to improve the activity and the stereospecificity of the catalyst, and in addition, the proportion of fine powder among the polymers produced in the presence of the catalyst will increase.

(B) Organoaluminium Compounds:

Organoaluminium compounds (B) to be used in the invention may be those containing any of alkyl groups, halogen atoms, hydrogen atoms, and alkoxy groups, as well as aluminoxanes and their mixtures. Concretely, they include trialkylaluminiums such as trimethylaluminium, triethylaluminium, triisopropylaluminium, triisobutylaluminium, trioctylaluminium, etc.; dialkylaluminium monochlorides such as diethylaluminium monochloride, diisopropylaluminium monochloride, diisobutylaluminium monochloride, dioctylaluminium monochloride, etc.; alkylaluminium sesqui-halides such as ethylaluminium sesqui-chloride, etc.; linear aluminoxanes such as methylaluminoxane, etc. Of those organoaluminium compounds, preferred are trialkylaluminiums with lower alkyl groups each having from 1 to 5 carbon atoms; and especially preferred are trimethylaluminium, triethylaluminium, tripropylaluminium, and triisobutylaluminium. One or more of these organoaluminium compounds may be used either singly or combined.

(C) Third Component (electron-donating compounds):

The catalyst for olefin polymerization of the invention optionally contains an electron-donating compound as the component (C). The electron-donating compound for the component (C) includes alkoxy group-having organosilicon compounds, nitrogen-containing compounds, phosphorus-containing compounds, and oxygen-containing compounds. Of those, preferred are alkoxy group-having organosilicon compounds.

Specific examples of the alkoxy group-having organosilicon compounds include tetramethoxysilane, tetraethoxysilane, tetrabutoxysilane, tetraisobutoxysilane, trimethylmethoxysilane, trimethylethoxysilane, triethylmethoxysilane, triethylethoxysilane, ethylisopropyldimethoxysilane, propylisopropyldimethoxysilane, diisopropyldimethoxysilane, diisobutyldimethoxysilane, isopropylisobutyldimethoxysilane, di-t-butyldimethoxysilane, t-butylmethyldimethoxysilane, t-butylethyldimethoxysilane, t-butylpropyldimethoxysilane, t-butylisopropyldimethoxysilane, t-butylbutyldimethoxysilane, t-butylisobutyldimethoxysilane, t-butyl(s-butyl)dimethoxysilane, t-butylamyldimethoxysilane, t-butylhexyldimethoxysialne, t-butylheptyldimethoxysilane, t-butyloctyldimethoxysilane, t-butylnonyldimethoxysilane, t-butyldecyldimethoxysilane, t-butyl(3,3,3-trifluoromethylpropyl)dimethoxysilane, cyclopentyl-t-butyldimethoxysilane, cyclohexyl-t-butyldimethoxysilane, dicyclopentyldimethoxysilane, bis(2-methylcyclopentyl)dimethoxysilane, bis(2,3-dimethylcyclopentyl)dimethoxysilane, diphenyldimethoxysilane, phenyltriethoxysilane, methyltriethoxysilane, ethyltriethoxysilane, propyltrimethoxysilane, isopropyltrimethoxysilane, butyltrimethoxysilane, isobutyltrimethoxysilane, t-butyltrimethoxysilane, s-butyltrimethoxysilane, amyltrimethoxysilane, isoamyltrimethoxysilane, cyclopentyltrimethoxysilane, cyclohexyltrimethoxysilane, norbornanetrimethoxysilane, indenyltrimethoxysilane, 2-methylcyclopentyltrimethoxysilane, cyclopentyl(t-butoxy) dimethoxysilane, isopropyl (t-butoxy) dimethoxysilane, t-butyl(isobutoxy)dimethoxysilane, t-butyl(t-butoxy)dimethoxysilane, thexyltrimethoxysilane, thexylisopropoxydimethoxysilane, thexyl(t-butoxy)dimethoxysilane, thexylmethyldimethoxysilane, thexylethyldimethoxysilane, thexylisopropyldimethoxysilane, thexylcyclopentyldimethoxysilane, thexylmyristyldimethoxysilane, thexylcyclohexyldimethoxysilane, neopentylpentyldimethoxysilane, diisopentyldimethoxysilane, isopentylisobutyldimethoxysilane, neopentylisopentyldimethoxysilane, etc. One of more of these organosilicon compounds may be used either singly or combined.

Specific examples of the nitrogen-containing compounds include 2,6-substituted piperidines such as 2,6-diisopropylpiperidine, 2, 6-diisopropyl-4-methylpiperidine, N-methyl-2,2,6,6-tetramethylpiperidine, etc.; 2,5-substituted azolidines such as 2,5-diisopropylazolidine, N-methyl-2,2,5,5-tetramethylazolidine, etc.; substituted methylenediamines such as N,N,N',N'-tetramethylmethylenediamine, N,N,N',N'- tetraethylmethylenediamine, etc.; substituted imidazolidines such as 1,3-dibenzylimidazolzidine, 1,3-dibenzyl-2-phenylimidazolidine, etc.

Specific examples of the phosphorus-containing compounds include phosphites such as triethyl phosphite, tri-n-propyl phosphite, triisopropyl phosphite, tri-n-butyl phosphite, triisobutyl phosphite, diethyl-n-butyl phosphite, diethylphenyl phosphite, etc.

Specific examples of the oxygen-containing compounds include 2,6-substituted tetrahydrofurans such as 2,2,6,6-tetramethyltetrahydrofuran, 2,2,6,6-tetraethyltetrahydrofuran, etc.; dimethoxymethane derivatives such as 1,1-dimethoxy-2,3,4,5-tetrachlorocyclopentadiene, 9,9-dimethoxyfluorene, diphenyldimethoxymethane, etc.

[II] Preparation of Solid Catalyst Components

To prepare the solid catalyst components (A) as above, the titanium compound (a), the magnesium compound (b), the electron donor (c) and optionally the silicon compound (d) are brought into contact with each other by ordinary methods.

For bringing them into contact with each other, employable are known methods such as those described in Japanese Patent Laid-Open Nos. 43094/1978, 135102/1980, 135103/1980, 18606/1981, etc. For example, employable are (1) a method comprising grinding a magnesium compound, or a complex compound of a magnesium compound with a dimalonate compound, in the presence of a dimalonate compound and optionally a grinding promoter, followed by reacting the thus-ground powder with a titanium compound; (2) a method comprising reacting a liquid magnesium compound not having reducing capabilities with a liquid titanium compound in the presence of a dimalonate compound, thereby giving a precipitate of a solid titanium complex; (3) a method of further reacting the product in (1) or (2) with a titanium compound; (4) a method of further reacting the product in (1) or (2) with a dimalonate compound and a titanium compound; and (5) a method comprising grinding a magnesium compound, or a complex compound of a magnesium compound with a dimalonate compound, in the presence of a dimalonate compound, a titanium compound and optionally a grinding promoter, followed by processing the thus-ground powder with a halogen or a halogen compound.

Apart from the methods as above, still further employable are the methods described in Japanese Patent Laid-Open Nos. 166205/1981, 63309/1982, 190004/1982, 300407/1982, 47003/1983, etc., for preparing the solid catalyst components (A).

What is more, still another method is employable for preparing the solid catalyst components. The method comprises bringing into contact a solid oxide of an element of Groups II to IV of the Periodic Table (e.g., silicon oxide, magnesium oxide, etc.), or a solid composite oxide containing at least one oxide of an element of Groups II to IV of the Periodic Table (e.g., silica-alumina, etc.), which carries therewith a magnesium compound such as that noted above, with an electron donor and a titanium compound, in a solvent at a temperature falling between 0 and 200° C., preferably between 10 and 150° C., for a period of from 2 minutes to 24 hours.

It is desirable that the amount of the titanium compound to be used for the reaction falls generally between 0.5 and 100 mols, but preferably between 1 and 50 mols, relative to one mol of magnesium in the magnesium compound to be reacted therewith. It is also desirable that the amount of the electron donor for the reaction falls generally between 0.01 and 10 mols, but preferably between 0.05 and 1.0 mol, relative to one mol of magnesium in the magnesium compound to be reacted therewith. If desired, a halide such as silicon tetrachloride maybe added to the reaction system.

The temperature for the contact of the components may fall generally between −20 and 200° C., preferably between 20 and 150° C. The time for the contact thereof may fall generally between 1 minute and 24 hours, preferably between 10 minutes and 6 hours.

The order for bringing into contact the components with each other is not specifically defined. For example, the components may be brought into contact with each other in the presence of an inert solvent of, for example, hydrocarbons and the like; or the components may be previously diluted with an inert solvent of, for example, hydrocarbons and the like, and then brought into contact with each other. The inert solvent includes, for example, aliphatic hydrocarbons such as n-pentane, isopentane, n-hexane, n-heptane, n-octane, isooctane, etc.; aromatic hydrocarbons such as benzene, toluene, xylene, etc.; and their mixtures.

If desired, brought the components into contact with a titanium compound may be repeated twice or more, whereby the magnesium compound serving as a catalyst carrier could well carry the titanium compound therewith.

The solid catalyst components thus prepared through the contacting operation as above may be washed with an inert solvent of, for example, hydrocarbons and the like. The inert solvent may be the same as above. The solid products may be stored in dry, or in an inert solvent of, for example, hydrocarbons and the like.

[III] Polymerization

Regarding the amount of the catalyst components of the invention for polymerization, the solid catalyst component (A) may be used generally in an amount of from 0.0005 to 1 mmol in terms of the titanium atom therein, per one liter of the reaction capacity; and the amount of the organoaluminium compound (B) may be so controlled that the atomic ratio of aluminium/titanium falls generally between 1 and 1000, preferably between 10 and 500. If the atomic ratio oversteps the defined range, the catalyst activity will be low. The amount of the electron-donating compound of the component (C) may be so controlled that the molar ratio of electron-donating compound (C)/organoaluminium compound (B) falls generally between 0.001 and 5.0, preferably between 0.01 and 2.0, more preferably between 0.05 and 1.0. If the molar ratio oversteps the defined range, the catalyst could not have good activity.

As olefins to be polymerized herein, preferred are α-olefins of a general formula (VI):

$$R^{10}-CH=CH_2 \qquad (VI)$$

In formula (VI), $R^{10}$ represents a hydrogen atom, or a hydrocarbon group. The hydrocarbon group may be saturated or unsaturated, and may be linear, branched or cyclic. Specific examples of such α-olefins include ethylene, propylene, 1-butene, 1-pentene, 1-hexene, 1-heptene, 1-octene, 1-decene, 3-methyl-1-pentene, 4-methyl-1-pentene, vinylcyclohexane, etc. One or more of these olefins may be homopolymerized or copolymerized.

Of the olefins noted above, especially preferred are ethylene and propylene. In addition, dienes such as butadiene, etc., and any other various olefins are also employable herein for polymerization.

Regarding their polymerization mode in the invention, optionally, olefins may be pre-polymerized and then polymerized. In that case, for example, olefins are first pre-polymerized in the presence of a catalyst (the catalyst is prepared by mixing the solid catalyst component (A), the organoaluminium compound and (C) the electron-donating compound in a predetermined ratio), at a temperature generally falling between 1 and 100° C. and under a pressure generally falling between normal pressure and 50 kg/cm$^2$G or so, and then further polymerized in the presence of the catalyst and the prepolymer having been produced in the pre-polymerization step. The polymerization mode in the final polymerization step is not specifically defined. The final polymerization may be effected in any mode of solution polymerization, slurry polymerization, vapor-phase polymerization, bulk polymerization and so on, to which is applicable any of batch polymerization or continuous polymerization, or even two-stage or higher poly-stage polymerization in which different stages are effected in different conditions.

Regarding the reaction condition, the polymerization pressure is not specifically defined, and may fall generally between atmospheric pressure and 80 kg/cm$^2$G, preferably between 2 and 50 kg/cm$^2$G, the polymerization temperature may fall generally between 0 and 200° C., preferably between 30 and 100° C. As depending on the type of the starting material, olefins and on the polymerization temperature, the polymerization time could not be determined indiscriminately, but may fall generally between 5 minutes and 20 hours or so, preferably between 10 minutes and 10 hours or so.

The molecular weight of the polymers to be produced could be controlled by adding a chain transfer agent, preferably hydrogen to the polymerization system. If desired, the polymerization may be effected in the presence of an inert gas such as nitrogen or the like.

Regarding the catalyst components of the invention to be used in the polymerization, the components (A), (B) and (C) may be premixed in a predetermined ratio and directly contacted with each other, to which olefins may be immediately applied and polymerized in the presence of the thus-prepared catalyst. Alternatively, after the components have been contacted with each other, the resulting catalyst may be ripened for 0.2 to 3 hours or so, and thereafter olefins may be applied and polymerized in the presence of the thus-ripened catalyst. If desired, the catalyst components may be previously suspended in an inert solvent or an olefin, and then fed into the polymerization system.

In the invention, the post-treatment after polymerization may be effected in any ordinary manner. For example, in vapor-phase polymerization, the powdery polymer produced is taken out of the polymerization reactor, and then passed through a nitrogen stream atmosphere so as to remove the non-reacted olefins from it. If desired, the polymer may be pelletized through an extruder. In this step, a small amount of water, an alcohol or the like may be added to the polymer so as to completely inactivate the catalyst. In bulk polymerization, the polymer produced is taken out of the polymerization reactor, then monomers are completely removed from it, and thereafter the polymer may be pelletized.

EXAMPLES

The invention is concretely described hereinunder with reference to the following Examples, which, however, are not intended to restrict the scope of the invention. The intrinsic viscosity [η] and the stereospecificity [mmmm] of the polymers produced were obtained according to the methods mentioned below.

Intrinsic Viscosity [η]:

A sample was dissolved in decalin, and its intrinsic viscosity was measured at 135° C.

Stereospecificity [mmmm]:

A polymer sample was dissolved in a mixed solvent of 1,2,4-trichlorobenzene and heavy benzene (90/10, by volume), and subjected to a proton complete decoupling method for $^{13}$C-NMR (using JEOL' LA-500) at 130° C. Based on the signals for the methyl group obtained in the method, the stereospecificity [mmmm] of the sample was determined. The stereospecificity was proposed by A. Zambelli et al. in "Macromolecules, 6, 925 (1973)", and it indicates the isotactic fraction in the pentad unit of a polypropylene molecular chain as measured in $^{13}$C nuclear magnetic resonance spectrometry. For the attribution of the peaks seen in the $^{13}$C nuclear magnetic resonance spectrometry, referred to was the A. Zambelli et al's proposal in "Macromolecules, 8, 687 (1975)".

Example 1

(1) Preparation of Solid Catalyst Component

A three-neck flask having a capacity of 0.5 liters and equipped with a stirrer was purged with nitrogen gas, into which were put 60 ml of dewatered heptane and 4.0 g (35 mmols) of diethoxymagnesium. After the mixture in the flask was heated at 40° C. for 20 minutes, 2.2 ml (9 mmols) of di-n-butyl dimethylmalonate was added thereto. Then, the resulting solution was heated up to 90° C., and 116 ml (1.04 mols) of titanium tetrachloride was added thereto. The mixture was stirred for 2 hours at an inner temperature of 110° C. Through the treatment, the carrier component carried the catalytic component therewith. Next, the thus-carried catalytic component was fully washed with dewatered heptane. 116 ml (1.04 mols) of titanium tetrachloride was again added thereto, and stirred for 2 hours at an inner temperature of 110° C. This is for the second treatment for making the carrier component carry the catalytic component therewith. After the second treatment, the thus-carried catalytic component was again fully washed with dewatered heptane. Thus was prepared a solid catalyst component (amount of titanium carried=1.21% by weight).

(2) Slurry Polymerization of Propylene

A stainless steel autoclave having a capacity of 1 liter and equipped with a stirrer was fully dried, and then purged with nitrogen. 400 ml of dewatered heptane was put into the autoclave at room temperature. Next, 0.5 mmols of triethylaluminium, 0.25 mmols of dicyclopentyldimethoxysilane, and 0.005 mmols, in terms of the Ti atom therein, of the solid catalyst component prepared above were put into the autoclave, into which hydrogen was fed under 1 kg/cm$^2$G. Subsequently, propylene was introduced into the autoclave, while being heated at 80° C. to have a total pressure of 8 kg/cm$^2$G. In that condition, propylene was polymerized for 60 minutes. After this, the reaction system was cooled and degassed, and the product was taken out of the autoclave, put into 2 liters of methanol in which the catalyst was inactivated. The thus-processed product was filtered, and the resulting residue was dried in vacuum. Thus was obtained a propylene polymer (catalyst activity: 436 kg-PP/g-Ti). The viscosity [η] of the polymer was 1.12 dl/g, and the stereospecificity [mmmm] thereof was 97.3%.

Example 2

In the same manner as in [Example 1], a catalyst was prepared and a monomer propylene was polymerized in the presence of the catalyst. In this, however, di-n-heptyl dimethylmalonate was used in place of di-n-butyl dimethylmalonate in preparing the solid catalyst component. The amount of Ti carried in the solid catalyst component was 1.8% by weight. The polymerization activity of the catalyst was 336 kg-PP/g-Ti; [η] of the polymer was 1.10 dl/g; and the stereospecificity [mmmm] of the polymer was 96.7%.

Comparative Example 1

In the same manner as in [Example 1], a catalyst was prepared and a monomer propylene was polymerized in the presence of the catalyst. In this, however, diethyl diisobutylmalonate was used in place of di-n-butyl dimethylmalonate in preparing the solid catalyst component. The amount of Ti carried in the solid catalyst component was 2.8% by weight. The polymerization activity of the catalyst was 297 kg-PP/g-Ti; [η] of the polymer was 1.09 dl/g; and the stereospecificity [mmmm] of the polymer was 95.9%.

INDUSTRIAL APPLICABILITY

The present invention provides solid catalyst components with high activity and high stereospecificity for olefin polymerization, catalysts for olefin polymerization and processes for producing olefin polymers, for which are used, as the electron donor, compounds with no problems of safety and hygiene. The compounds for the electron donor are inexpensive and are easy to produce.

What is claimed is:

1. A solid catalyst component for olefin polymerization, comprising titanium, magnesium, and a compound of the following general formula (I) as an electron donor:

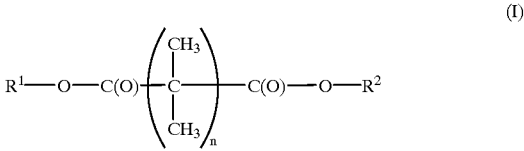

wherein $R^1$ and $R^2$ may be the same or different and each represents a linear or branched hydrocarbon group having from 1 to 20 carbon atoms; and n is an integer of from 1 to 10.

2. A catalyst for olefin polymerization, comprising (A) the solid catalyst component for olefin polymerization of claim 1, and (B) an organoaluminium compound.

3. A catalyst for olefin polymerization, comprising (A) the solid catalyst component for olefin polymerization of claim 1, (B) an organoaluminium compound, and (C) an electron-donating compound as the third component.

4. The catalyst for olefin polymerization as claimed in claim 3, wherein the electron-donating compound for the third component (C) is an organosilicon compound.

5. A process for producing olefin polymers, which comprises polymerizing olefins in the presence of the catalyst for olefin polymerization of claim 2.

6. A process for producing olefin polymers, which comprises polymerizing olefins in the presence of the catalysts for olefin polymerization of claim 3.

7. A process for producing olefin polymers, which comprises polymerizing olefins in the presence of the catalysts for olefin polymerization of claim 4.

* * * * *